Figure 1:
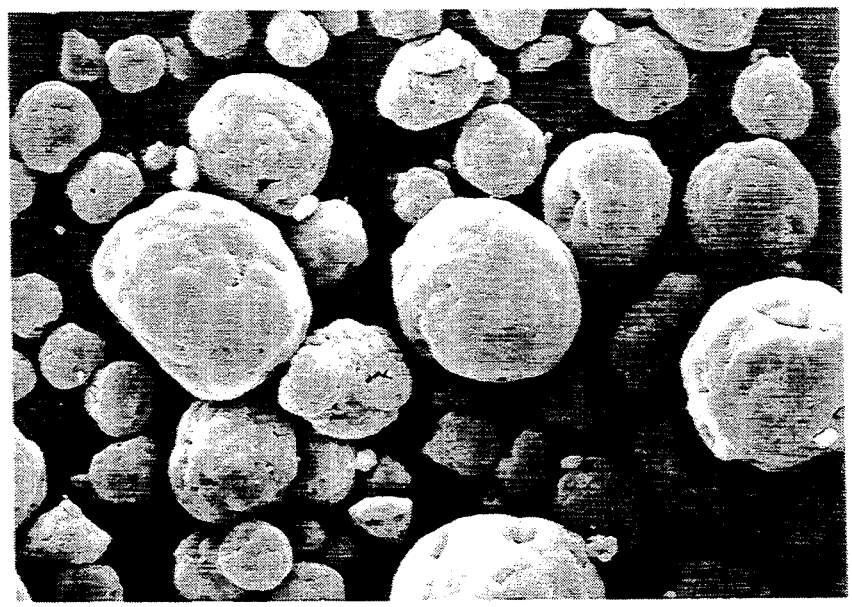
Figure 2:
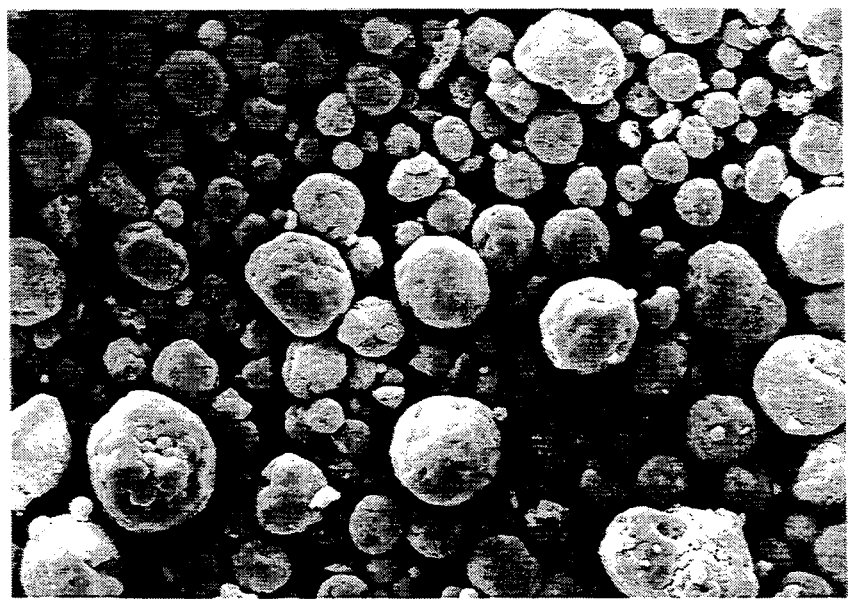
Figure 3:
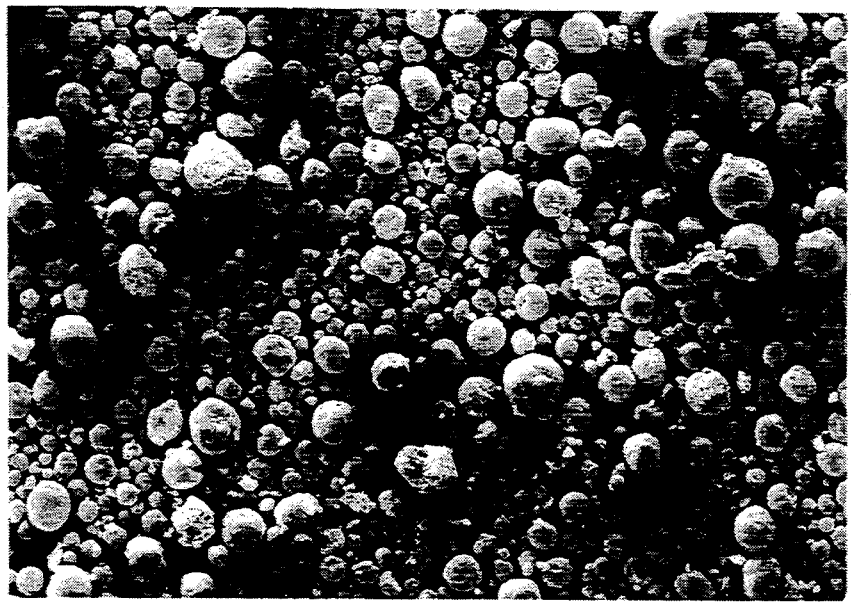
Figure 4:
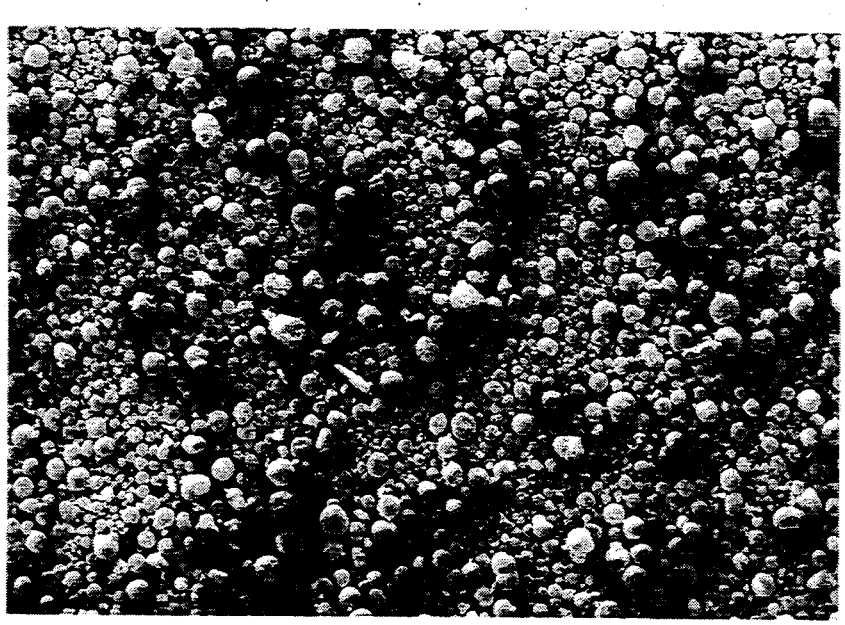

United States Patent [19]

Marsden

[11] Patent Number: 5,426,082

[45] Date of Patent: Jun. 20, 1995

[54] CATALYSTS AND CATALYST SUPPORTS

[75] Inventor: Christine E. Marsden, Chester, England

[73] Assignee: Unilever Patent Holdings, B. V., Vlaardingen, Netherlands

[21] Appl. No.: 63,961

[22] Filed: May 12, 1993

[30] Foreign Application Priority Data

May 13, 1992 [GB] United Kingdom ............... 9210265

[51] Int. Cl.⁶ .................. B01J 21/06; B01J 23/26
[52] U.S. Cl. .................. 502/235; 502/236; 502/237; 502/238; 502/239; 526/106
[58] Field of Search ........... 502/235, 236, 237, 238, 502/239

[56] References Cited

U.S. PATENT DOCUMENTS

| | | |
|---|---|---|
| 3,652,215 | 3/1972 | Aboutboul et al. . |
| 3,794,713 | 2/1974 | Aboutboul et al. . |
| 3,867,306 | 2/1975 | Witt et al. . |
| 3,887,494 | 6/1975 | Dietz . |
| 3,900,457 | 8/1975 | Witt . |
| 3,977,993 | 8/1976 | Lynch ................................ 502/237 |
| 3,984,351 | 10/1976 | Rekers et al. . |
| 4,042,769 | 8/1977 | Lynch . |
| 4,053,436 | 10/1977 | Hogan et al. . |
| 4,186,260 | 1/1980 | Dietz . |
| 4,228,260 | 10/1980 | Scholten et al. . |
| 4,386,016 | 5/1983 | Scholten et al. . |
| 4,424,320 | 1/1984 | McDaniel . |
| 4,472,531 | 9/1984 | Speca et al. ......................... 502/237 |
| 4,689,315 | 8/1987 | Anton et al. . |
| 4,981,831 | 1/1991 | Knudsen et al. .................... 502/236 |

FOREIGN PATENT DOCUMENTS

| | | |
|---|---|---|
| 040362 | 11/1981 | European Pat. Off. . |
| 137258 | 4/1985 | European Pat. Off. . |
| 199930 | 11/1986 | European Pat. Off. . |
| 270919 | 6/1988 | European Pat. Off. . |
| 352715 | 7/1989 | European Pat. Off. . |
| 347926 | 12/1989 | European Pat. Off. . |
| 2015130 | 4/1970 | France . |
| 1483871 | 8/1977 | United Kingdom . |

OTHER PUBLICATIONS

Bohn et al., The Microreactor as a Model for the Description of the Ethylene Polymerization with Heterogeneous Catalysts, Ed W Kaminski and H Sinn. Springer-Verlag, Merlin, 1988, pp. 391–403.

Primary Examiner—Asok Pal
Attorney, Agent, or Firm—Cushman Darby & Cushman

[57] ABSTRACT

Microspherical cogel particles comprising silica and at least one other metal oxide are prepared by forming a slurry of porous particulate material comprising silica and a liquid medium comprising at least 90%, by weight of the liquid medium, of an organic liquid and subjecting the slurry to spray drying. The method enables agglomeration of particulate material of especially small particle size to obtain microspherical particles of a size especially suitable for us as a catalyst support. The particles have a pore size of at least 2 cc/g and, especially when the particles contain titanium atoms, are especially suitable for use in the preparation of a catalyst for the polymerization of olefins.

25 Claims, 3 Drawing Sheets

CATALYSTS AND CATALYST SUPPORTS

This invention relates to catalysts and catalyst supports, particularly for the polymerization of olefins, especially ethylene.

It is well-known that catalysts comprising a silica gel support and containing chromium are useful in the polymerization of olefins. The nature of the resulting polymer is highly dependent upon that of the catalyst, so that variations in the characteristics of the catalyst will cause variations in, for example, the molecular weight, melt index, bulk density, particle shape, particle size, particle size distribution and reaction temperature which may be employed to effect polymerization. Furthermore, the nature of the catalyst is highly dependent upon its method of preparation.

By way of example, reference is made to U.S. Pat. No. 3,887,494, which describes the preparation of a silica-containing composition which is catalytically active for olefin polymerization and which comprises the following steps, namely (a) adding a titanium compound to a mineral acid (titanium is known to increase the melt index, this reflecting a lower molecular weight of the resulting polymer), (b) introducing an alkali metal silicate into the acid containing the titanium compound to form a hydrogel, (c) ageing the hydrogel for a period greater than one hour (this ageing step considerably increases the strength of the resulting catalyst), (d) thereafter washing the hydrogel to remove alkali metal ions, thus leaving the hydrogel in an aqueous medium, (e) removing the water from the washed hydrogel using an organic liquid which is both water soluble and contains oxygen (the methods of repeated washing and azeotropic distillation are mentioned specifically), (f) removing the organic compound and any remaining water to form a xerogel, (g) incorporating chromium into the composition, for example, as an aqueous solution added to the mineral acid with step (a) or in an organic solvent medium impregnated into the composition immediately after drying by step (f), and (h) calcining the xerogel from step (f) at 480°–980° C. to obtain the desired composition. Variations of this process are described in U.S. Pat. No. 3,867,306, U.S. Pat. No. 3,900,457, U.S. Pat. No. 4,424,320 and U.S. Pat. No. 4,053,436.

In order to provide a polymer having a high melt index, a broader molecular weight distribution and increased bulk density, EP-A-0352715 describes a variation in the above process in which the cogel produced by steps (a) and (b) of U.S. Pat. No. 3,887,494 is prepared under neutral conditions, then aged under neutral conditions and thereafter subjected to a second ageing step under alkali conditions before spray drying.

U.S. Pat. No. 4,288,280 and U.S. Pat. No. 4,386,016 describe respective methods of converting silica particles obtained by flame hydrolysis of a silicon-halogen compound into a form suitable for use a catalyst support in the polymerization of olefins. The particles are admixed with a sufficient amount of water to form a gel which is then aged, and thereafter spray-dried from water (U.S. Pat. No. 4,288,260) or from a mixture of water and an alcohol (U.S. Pat. No. 4,386,016) to produce a xerogel which is then impregnated with chromium and thereafter calcined to obtain a catalyst. In U.S. Pat. No. 4,386,016, the water/alcohol mixture is used as the spray drying medium in order to enable the product to have a relatively high pore volume when the original particles have a relatively high surface area (though in fact some loss in pore volume did occur).

The silica particles obtained by flame hydrolysis are very fine, essentially homogeneous particles which are non-porous. Although, during the spray drying process, they agglomerate to form larger particles, nevertheless because of their non-porous nature, their internal structure does not contribute towards the porosity of the spray dried product. Hence this product is entirely different from products produced from porous gel particles, especially as regards their pore size distribution within the particles of the spray dried product. Furthermore, such products did not have, simultaneously, a particularly high pore volume and surface area.

In all of the processes described above, one step of significance is that of removing the water from the aged gel. The method in which this step is carried out can influence greatly the shape, size and pore volume of the resulting particles. This in turn influences greatly the shape and size of the particles, and other physical characteristics of the polymer resulting from the catalytic process; see Böhm et al, "Transition Metals and Organometallics as Catalysts for Olefin Polymerization", Ed. W. Kaminski and H. Sinn, Springer-Verlag, Berlin, 1988. In general, the larger are the catalyst particles, the larger are the polymer particles, provided that the particles are not so large as to not fragment during the polymerization process. Moreover, the shape and particle size distribution of the polymer particles tends to be the same as that of the catalyst particles. Furthermore, the higher is the pore size of the catalyst particles, then the higher is the melt index of the resulting polymer.

The polymer producer requires a catalyst to be capable of providing the specific characteristics which he is seeking. In particular, he often requires a polymer having a relatively high melt index and in a particulate form in which the particles are substantially spherical and are of a sufficiently large particle size, for example, to avoid dust formation. Accordingly, the provision of particulate silica having an increased pore size and in the form of spherical particles having a desired particle size, particle size distribution and pore size distribution within the particles, would be highly advantageous.

EP-A-0352715 describes several methods of removing water from an aged gel, these alternatives, in ascending order of the pore volume (given in brackets) of the resulting particles being (i) oven drying from water ($<1$ cc/g), (ii) spray drying from water (ca 1 cc/g), (iii) oven drying from water containing a surfactant as a pore preserving agent (up to 1.25 cc/g), (iv) washing with alcohol, followed by oven drying (up to 1.92 cc/g) and (v) azeotropic distillation from hexanol (up to 2.17 cc/g).

Thus, azeotropic distillation provides the highest pore volume. However, the resulting particles tend to be granular in shape, these producing undesirable granular shaped polymer particles.

EP-A-0270919 describes the preparation of spherical particles by spray drying hydrogel particles from an aqueous medium and thereafter washing with ammonia and then with ethanol until about 95% of water had been extracted from the hydrogel. The particles are dried at 180° C. under a vacuum and are then ground gently to isolate particles of a size 50–100 μm. There is a general disclosure of particles having a pore volume of 1–3 cm$^3$/g, a surface area of 200–600 m$^2$/g and a particle size of 50–15 μm with a difference between maximum and minimum sizes of at most 50 μm. It is to be noted that the step of spray drying from an aqueous medium will limit the maximum pore volume attainable and there is no specific disclosure of particles simultaneously having both a high pore volume of at least 2 cc/g and a particularly high surface area.

U.S. Pat. No. 4,042,769 describes a process for preparing particles having both a high pore volume and high surface area in which water in a hydrogel is replaced by ethanol. The ethanol is dried continuously until its water content is reduced to a level of 200 ppm or less by venting it from an apparatus at a temperature and pressure above its critical point and then rigorously drying with anhydrous air.

U.S. Pat. No. 3,652,215 describes the preparation of silica gel particles having a mean diameter of from 30 to 150 microns by a process which includes adding an acid medium to a sodium silicate solution in a specified manner to obtain a gel in an aqueous medium, comminuting the gel to the desired particle size, and displacing the water from the gel using a surfactant, alcohol, acetone or other organic compound to reduce the surface tension of the wetting agent in the pores. The gel is then dried. In the Examples, acetone is used to displace the water to a level of less than 1%, after which the product is homogenized and the acetone distilled off. The product is then calcined and, as described in U.S. Pat. No. 3,984,351, can then be used in the preparation of an olefin polymerization catalyst. According to U.S. Pat. No. 3,984,351, the product is a microspheroidal silica gel having a pore volume of about 2.5 cc/g.

It will be noted from U.S. Pat. No. 3,652,215 and EP-A- 0352715 (see especially Example 1) that it is necessary to subject the particles to a comminution step, which usually involves a milling and sieving operation at some time prior to activation of the catalyst by calcining. This results in much waste due to the formation of unwanted particles, the smaller particles also causing a dust hazard.

Surprisingly, we have found that particles of a material comprising a cogel of silica and at least one other metal oxide, especially suitable for use in a catalyst for the polymerization of an olefin, can be obtained by the method described below. This can be controlled so as to provide particles having a substantially spherical shape, the desired particle size and particle size distribution and, in particular, high pore volume, with a particularly suitable pore size distribution.

Thus, the invention provides a method of preparing substantially spherical particles comprising a cogel of silica and at least one other metal oxide, which method comprises the steps of
(1) providing a composition comprising a hydrogel and an aqueous medium, which hydrogel comprises a cogel of silica and at least one other metal oxide,
(2) where the composition contains alkali metal ions, washing the composition until no more than 0.1%, by weight of solid material in the composition, of the alkali metal ions is present,
(3) ageing the composition,
(4) exchanging water in the composition for an organic liquid until the amount of water present in the composition is no more than 25% by weight of the total weight of the organic liquid and water so as to provide a slurry of a porous particulate cogel material in a liquid medium comprising at least 75%, by weight of the liquid medium, of the organic liquid; and
(5) subjecting the slurry to spray drying.

According to another aspect the invention provides a material, obtainable by the above method, which material comprises a cogel of silica and at least one other metal oxide, preferably titanium, which material takes the form of substantially spherical particles having a pore volume as high as at least 2 cc/g.

Preferably, the particles have a surface area of at least 300 m$^2$/g, more preferably from 400 to 600 m$^2$/g inclusive.

The weight mean particle size may lie in the range 20 to 150 microns, typically 25 to 120 microns. We can find no reference to such particles, obtainable by the method in accordance with the invention, in the literature.

We find it particularly surprising that by this method, small hydrogel particles, formed, for example, by milling, which have been organic liquid exchanged, hold together after the spray drying operation to produce spherical particles having a particularly high pore volume, preferably $\geq 2$ cc/g, more preferably $\geq 2.3$ cc/g.

This enables spherical polymer particles to be produced when using such particles as a catalyst support, so providing an improved polyolefin polymer product as compared with conventional commercially available polyolefins which tend to be granular.

The process is especially suitable for use with hydrogel particles which are themselves porous and which therefore contribute to the overall porosity of the final product.

The concentration of particles in the slurry is preferably from 1-15%, more preferably 5-10%, by weight of the total weight of the slurry, this resulting in a silica concentration of from 0.9-14.85% by weight of the total weight of the slurry.

The spray drying is preferably carried out in an inert atmosphere and with an inlet temperature of from about 250°-450° C., more preferably 300°-400° C., and an outlet temperature of from 80°-150° C., more preferably from 90°-110° C.

The liquid of the slurry comprises an organic liquid present in an amount, by weight of the total weight of the liquid, of at least 75%. Preferably the amount of organic liquid present in the slurry is as large as possible consistent with convenient and inexpensive water removal procedure and may, with increasing preference, be at least 80%, at least 85%, at least 90%, at least 96%, and especially at least 98.5%, by weight of the liquid of the slurry, the remainder optionally being water. Such levels can be achieved without laborious time consuming and expensive water removal treatment.

The organic liquid is preferably miscible with water and more preferably contains oxygen and typical examples are alcohols such as methanol, ethanol, n-propyl and isopropyl alcohols, n-, sec- and tert-butyl alcohols, pentan-1-ol, pentan-2-ol, 3-methylbut-1-ol, and hexan-1-ol, ketones such as acetone, methyl propyl ketone and methyl isobutyl ketone, esters such as ethyl and isopropyl acetate and aldehydes such as butyl aldehyde and any combination of the above.

The particles comprise cogels of silica and additionally at least one metal oxide which may be selected from $TiO_2$, $Al_2O_3$, $ZrO_2$ and $MgO$. Examples of such cogels are $SiO_2$—$TiO_2$, $SiO_2$—$Al_2O_3$, $SiO_2$-$Al_2O_3$—$TiO_2$, $SiO_2$—$ZrO_2$ and $SiO_2$—$MgO$.

The particles may contain additionally a catalytically active chromium compound (especially $CrO_3$) or a compound convertible thereto.

The particle size produced by spray drying is preferably $\leq 250$ microns, especially $\leq 200$ microns for application in slurry phase polymerization or ≦100 microns for application in gas phase polymerization. Furthermore, they are preferably of a size ≧5 microns, especially ≧10 microns for gas phase polymerization and ≧50 microns for slurry phase polymerization. Typically, for gas phase polymerization the particle size will lie in the range 10-90 microns, with a weight mean particle size of 30-50 microns, especially 40 microns, while for slurry phase polymerization the particle size will lie in the range 50-250 microns, especially 53-180 microns, with a weight mean particle size of 50-150 microns, especially 80-110 microns.

The pore volume of the resulting particles is determined by at least the nature of the feedstock particles, the nature of the organic liquid and the water content.

The particles of the feedstock slurry may be obtained by the steps of (i) providing a composition comprising a hydrogel and an aqueous medium, which hydrogel comprises silica,
(ii) where the composition contains alkali metal ions, washing the composition until no more than 0.1% by weight of the alkaline metal ions, by weight of solids, is present,
(iii) ageing the composition,
(iv) exchanging water in the composition for an organic liquid until the amount of water present in the composition is no more than 25%, preferably no more than 10%, more preferably no more than 5% and especially no more than 2%, more especially no more than 1.5%, by weight of the total weight of the organic liquid and water to provide a substantially water-free composition, and
(v) milling the substantially water-free composition to obtain the said slurry.

The hydrogel referred to in step (i) above may be prepared by the reaction of a mineral acid with an alkaline metal silicate in the presence of cations of the metal of the or each other metal present, as its oxide, in the cogel, thereby obtaining a hydrogel.

The washing step (ii) may be carried out either prior or subsequent to the ageing step (iii).

After washing and ageing of these particles and exchanging of the water therein for the organic liquid, the method preferably includes a milling operation carried out in the organic liquid so as to obtain a pumpable slurry of particles suitable for the spray drying process.

The step (iv) of exchanging the water for the organic liquid preferably comprises several successive exchanges with the organic liquid until the water content of the liquid medium to be used in the pumpable slurry (which may be obtained by further dilution with the organic liquid subsequent to the exchanges) lies below 25% by weight of the total weight of organic liquid and water.

Typically, a process for preparing a catalyst suitable for olefin polymerization comprises the following steps 1. Manufacture of a silica/titania hydrogel A water soluble titanium compound is dissolved in a suitable amount of a mineral acid to an amount which is to provide up to 6%, preferably from 0.5 to 5% by weight on a dry weight basis, in the hydrosol.

Using a high shear mixer well known in the art, the acid (containing Ti) and an alkali metal silicate solutions are mixed together in amounts such that the concentration of silica in the resulting hydrosol will be in the region of from 5 to 15% w/w.

The reaction is preferably carried out at a temperature of from 10° to 50° C., more preferably a temperature which is roughly ambient and a pH of from 3-9, more preferably 4-7, especially at about 4.5 to 5.5.

Preferably each of the pH, temperature and silica concentration are selected so as to provide a gelation time of 30 seconds, and no more than 10 minutes, more preferably at least 1 minute, especially at least 2 minutes, typically 3-5 minutes.

2. Washing

The hydrogel is preferably washed until an alkali metal level of <0.1% by weight of the total weight of the solids of the composition, ie dry basis, is obtained.

3. Ageing

This is preferably carried out at a pH of from 6-10, especially 7-9, preferably at a temperature of from 50°-100° C. for a period of at least one hour, more preferably at least 5 hours.

Preferably, after removal of surplus water not bound up in the hydrogel, the final concentration of the silica in the aged hydrogel is from 10-30% by weight of the hydrogel.

4. Organic Liquid Exchange

This is preferably carried out by successive exchanges with the organic liquid, which is preferably iso-propanol, by slurrying 100 parts by weight of the hydrogel with 100 parts by weight of the organic liquid and repeating the procedure preferably at least three, more preferably at least five, times and in any event until the water content of the hydrogel is no more than about 25% by weight of the total weight of organic liquid and water. Optionally, the resulting composition is diluted with further organic liquid before milling.

5. Milling

The solvent exchanged gel is milled until the overall particle size of the gel is suitable for spray drying, preferably from 1 to 60, more preferably from 5 to 50 micron inclusive, with a weight mean particle size of from 5 to 25 microns, and, for commercial production, more preferably 10-15 microns, inclusive, and then diluted with further organic liquid to obtain a pumpable slurry of silica/titania particles in a liquid medium.

6. Spray Drying

Using a flame proof spray dryer, the slurry of the silica/titania particles in the liquid medium, which slurry preferably contains 1-15%, more preferably 5-8%, by weight of the silica/titania particles, is spray dried in an inert atmosphere using an inlet temperature of from 250°-400° C., preferably 300°-400° C., and an outlet temperature of 80°-150° C., preferably 90°-110° C.

The liquid medium contains at least 75%, preferably at least 85%, more preferably at least 90%, most preferably at least 95%, especially at least 96% and more especially at least 98.5%, by weight of the organic liquid, the remainder of the liquid medium being water.

The operation of the spray drier can be controlled so as to provide particles of a required weight mean particle size. For example, for Gas phase polymerization particles of a size ranging from 10-90 microns are required, while for slurry phase polymerization, particles of a size ranging from 50-150 microns are required.

Alternatively, it is possible to Generate particles of a size ranging from 10 to 250 microns and then sieve at say 60-70 microns to yield a fine product (weight mean particle size 30'50 micron) for Gas phase polymerization, and a coarse product (weight mean particle size 80-100 micron) for slurry phase polymerization.

7. Introduction of Chromium

This is preferably introduced by anhydrous impregnation into the spray dried xerogel with a chromium compound, for example, chromium acetyl acetonate or tertiary butyl chromate, dissolved in a non-aqueous solvent, for example toluene, acetone or ethyl acetate, preferably toluene, preferably so as to provide a chromium concentration of from 0.5–2% by weight the total weight of the catalyst.

However, alternatively, the chromium can be introduced, for example, into the alkali silicate or acid before Gelation, for example in the form of chromium trioxide or chromium nitrate, or into the organic liquid exchanged gel prior to spray drying, for example as chromium acetate.

8. Activation of Catalyst

In order to activate the material for use as a catalyst, the particles may be calcined by any conventional method such as heating in an atmosphere of air to a temperature of at least about 450° C. and possibly up to 1000° C. Preferably, the minimum temperature is about 600° C. and the maximum about 900° C. The process may be carried out.

We find that a catalyst produced by the above method can be used in a process for polymerizing an olefin, especially ethylene, to produce large spherical particles of a polyolefin having a high melt index.

Thus, according to another aspect, the invention provides a process for preparing a polyolefin, which method comprises treating an olefin, preferably ethylene, with a catalyst at a temperature of at least 40° C. and a pressure of at least 10 bar, optionally in the presence of a hydrocarbon solvent, the catalyst comprising substantially spherical particles of a cogel of silica and at least one other metal oxide, which particles have a pore volume of at least 2 cc/g and activated chromium present in the particles.

The polymerization process is preferably carried out at a temperature of at least about 90° C. and not more than about 110° C., more preferably about 100°–105° C., while the preferred pressure is at least about 10 bar and not more than about 60 bar, more preferably about 20–50 bar, especially about 35–45 bar.

The process is preferably carried out in dry air, for example, in a fluidized bed.

As illustrated below with reference to electron micrographs of the polymer, large spherical particles of the polymer can be obtained which do not fragment during the polymerization process. This allows dust formation to be kept to a minimum.

Figure 5:
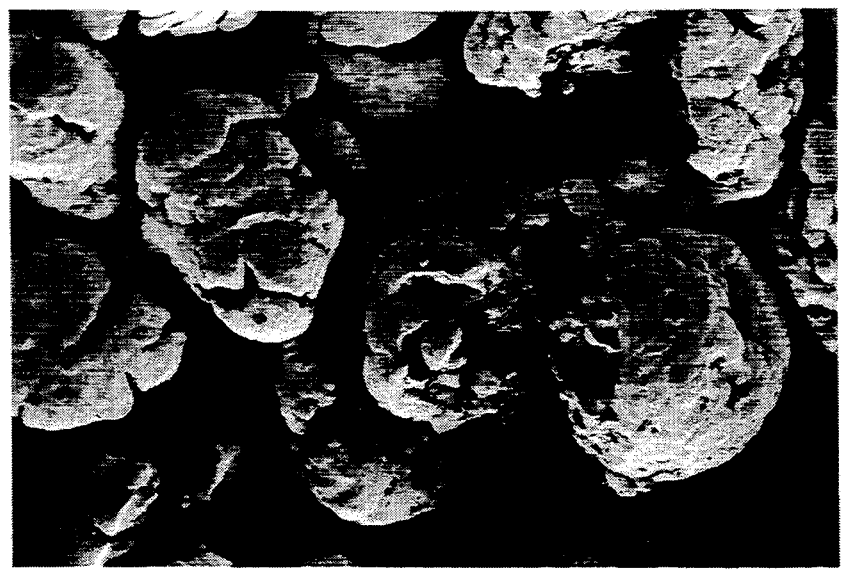
Figure 6:
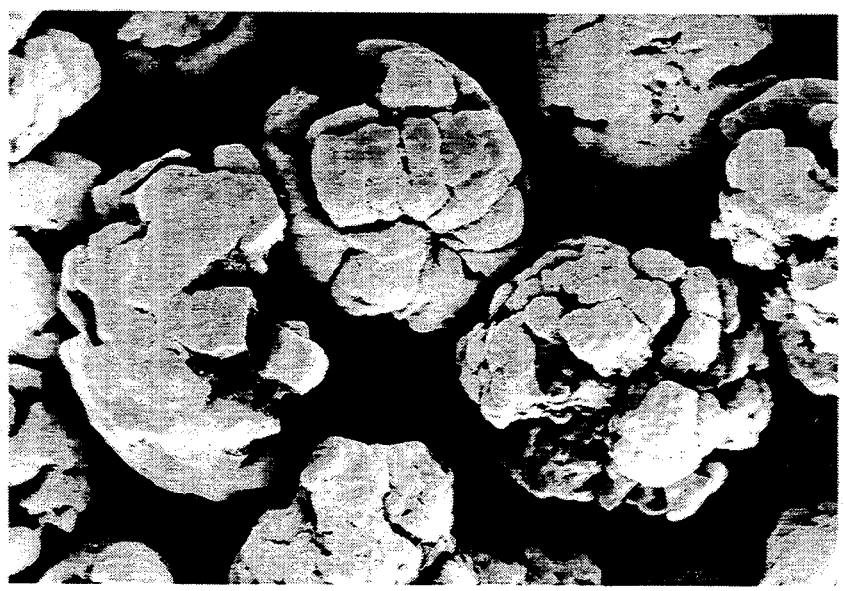

Preferred embodiment of the invention will now be described in more detail with reference to the following Examples, and accompanying drawings in which FIGS. 1–4 are electron micrographs of the cogel particles at different respective magnifications and FIGS. 5–6 are electron micrographs of polyethylene particles, again at different respective magnifications, which polymer particles are produced using the cogel particles as a catalyst support.

EXAMPLE 1

A. Preparation of Xerogel

A sulphuric acid solution containing 1.05% by weight of titanium is prepared by mixing 36 parts by weight of 50% sulphuric acid with 25 parts by weight of Tilcom TS, a titanium sulphate solution, commercially available from Tioxide Ltd. and diluting with 105 parts by weight of water. This is mixed with a solution of sodium silicate prepared by diluting 4 parts by weight of Crystal 79, a commercially available sodium silicate solution, with 3 parts by weight of water. This mixing is carried out continuously using a high shear mixer to obtain a sol having a pH of 5 and a temperature of 32° C. The gelation time is about 2 minutes and the resultant silica gel has a $SiO_2$ content of 12.1% w/w and a $TiO_2$ content of 0.33% w/w.

The hydrogel is washed until a sodium level of less than 0.1% by weight of solids is obtained and the pH is then increased to pH 8 by the addition of ammonium hydroxide. The hydrogel is then hydrothermally aged at pH 8 and a temperature of 80° C. for 8 hours, at which stage, syneresis results in some shrinkage and provides a $SiO_2$ content of 14.8% w/w and a $TiO_2$ content of 0.40% w/w.

Seven successive exchanges with isopropanol are then carried out in which 100 parts by weight of the hydrogel is slurried with 100 parts by weight of isopropanol. Alternatively, this can be carried out by a continuous extraction procedure in a column. The resulting isopropanol exchanged gel is diluted with isopropanol and milled to yield a hydrogel having the following particle size distribution as determined by Microtrac.

90% ≦ 59 μm
50% ≦ 17.1 μm
10% ≦ 5.2 μm

The $SiO_2$ concentration in the slurry is 5% w/w. This silica gel/isopropanol slurry was spray dried using a flame proof spray dryer at an inlet temperature of 350° C. and an outlet temperature of 100° C. to yield spherical particles of a particle size, as determined by Microtrac, of 90% ≦ 94.8 μm
50% ≦ 52.4 μm
10% ≦ 19.5 μm It can be seen from the previous particle size values that considerable agglomeration has taken place.

The particles have a pore volume of 2.46 cm$^3$/g (as determined by nitrogen adsorption/desorption) and a surface area of 568 m$^2$/g. The $TiO_2$ content of the cogel was 2.48% determined by XRF.

This xerogel is subsequently impregnated with chromium acetyl acetonate dissolved in toluene to produce a polymerization catalyst comprising spherical silica/titania particles of average particle size containing 1% chromium.

Electron micrographs of the xerogel are illustrated in FIGS. 1–4 which are taken at different respective magnifications, namely about ×500, ×250, ×100 and ×50. The spherical nature of the particles is clearly visible.

B. Preparation of Polyolefin

The Cr impregnated catalyst described above was heat activated in a fluidised bed activator using dry air at 700° C. for 5 hours. A small quantity of the activated catalyst was transferred to a slurry phase bench reactor. The reactor temperature was maintained at 104° C. and ethylene was added continuously to maintain the total reactor pressure at 40 bar.

The resulting polymer particles (productivity of 723 g polyethylene/g catalyst) are clearly spherical as shown in attached electron micrographs.

Electron micrographs of the polymer particles are illustrated in FIGS. 5–6 which are taken at different respective magnifications, namely ×50 and ×200.

EXAMPLE 2

A silica titania hydrogel containing 12.0% SiO$_2$ and 0.35% TiO$_2$ was prepared according to the procedure outlined in Example 1.

Following washing and ageing, successive exchanges with isopropanol were carried out to reduce the water content of the hydrogel to a low level. The resulting solvent exchanged gel was diluted with isopropanol to 10.0% solids and milled to produce a slurry for spray drying. The water content of the slurry determined by Karl Fisher titration was 1.04% (average particles size determined by Microtrac was 23μ).

The silica gel/isopropanol slurry was spray dried as described in Example 1 to yield spherical particles of average size 56.4μ determined by Micromesh Sieve Analyses. The particles has a pore volume (PV) of 2.52 cc/g determined by N$_2$ adsorption/desorption and a surface area (SA) of 540 m$^2$/g. The TiO$_2$ content determined by XRF (ie on dry basis) was 2.84%.

EXAMPLES 3-5

Small amounts of water were added to the milled solvent exchanged gel described in Example 2 to generate spray drying feedstocks containing 5.9, 11.9 and 22.2% water (determined by Karl Fisher titration). Spherical particles of similar size distribution to that obtained in Example 2 were generated upon spray drying but pore volumes clearly decreased with the amount of water present in the feed to the spray drier (Table 1).

TABLE 1

| Example | % Solids in Spray Drier Feed | % H$_2$O | PV (cc/g) | SA m$^2$/g |
|---|---|---|---|---|
| 2 | 10.0 | 1.04 | 2.52 | 540 |
| 3 | 8.5 | 5.9 | 2.42 | 534 |
| 4 | 7.3 | 11.9 | 2.33 | 521 |
| 5 | 5.7 | 22.2 | 2.05 | 508 |

EXAMPLE 6

A sulphuric acid solution containing 0.29% by weight of aluminium was prepared by mixing 10 parts by weight of LFA (7.63% Al$_2$O$_3$), a low free acid alum prepared from gibbsite, sulphuric acid and water, with 66 parts by weight of 50% sulphuric acid and diluting with 152 parts by weight of water. This was mixed with a solution of sodium silicate prepared by diluting 12 parts by weight of Crystal 79, a sodium silicate solution commercially available from Joseph Crosfield & Sons Limited, with 5 parts by weight of water.

Mixing was carried out continuously using a high sheer mixer to obtain a sol having a pH of 5.5 and a gelation time of 1 minute. The resultant silica hydrogel had a SiO$_2$ content of 12.0% and an Al$_2$O$_3$ content of 0.15%.

The hydrogel was washed until a sodium level of less than 0.1% by weight of solids was obtained and the pH was then increased to pH 8 by the addition of ammonium hydroxide. The hydrogel was then hydrothermally aged at pH 8 and a temperature of 80° C. for 6 hours, at which stage syneresis resulted in some shrinkage and provided a SiO$_2$ content of 14.1% w/w and an Al$_2$O$_3$ content of 0.17%.

Successive exchanges with isopropanol were carried out as described in Example 1. The resulting isopropanol exchanged gel was diluted further with 7.4% solids and 1.15% H$_2$O (determined by Karl Fisher titration).

This slurry was spray dried as described in Example 1 to yield spherical particles of average particle size 29.2μ as determined by Microtrac. The pore volume determined by N$_2$ adsorption/desorption was 2.37 cc/g and the surface area was 589 m$^2$/g. AlO$_2$O$_3$ content was approximately 1.21%.

COMPARATIVE EXAMPLE 7

The silica titania hydrogel described in Example 2 was diluted with water to a solids content of 9.8% and milled prior to spray drying. The particle size distribution of this aqueous spray drier feedstock, determined by Malvern, was:

90% 35.9μ
50% 16.4μ
10% 6.7μ

This aqueous silica gel slurry was spray dried using inlet and outlet temperatures of 350° C. and 120° C. respectively to yield spherical particles of a particle size, as determined by Malvern, of:

90% 72.7μ
50% 37.3μ
10% 10.6μ

Pore volume had collapsed to 1.14 cc/g although surface area was retained at 521 m$^2$/g.

This demonstrates that when spray drying from aqueous solution, for example, as taught in U.S. Pat. No. 4,053,436, the pore volume of the resulting particles is considerably less than that achieved by spray drying from an organic liquid, as in methods embodying the invention.

It can be seen from the above that the methods embodying the invention afford a particularly simple and efficient means of obtaining particles comprising silica and having properties especially suitable for catalysis such as a spherical configuration, a particularly high pore volume and surface area and exactly the required particle size, particle size distribution and pore size distribution within the particles.

I claim:
1. A method of preparing substantially spherical particles comprising a cogel of silica and at least one other metal oxide, which method comprises the steps of
   (1) providing a composition comprising a hydrogel and an aqueous medium, which hydrogel comprises a cogel of silica and at least one other metal oxide,
   (2) where the composition contains alkali metal ions, washing the composition until no more than 0.1%, by weight of solid material in the composition, of the alkali metal ions is present,
   (3) ageing the composition,
   (4) exchanging water in the composition for an organic liquid until the amount of water present in the composition is no more than 25% by weight of the total weight of the organic liquid and water so as to provide a slurry of a porous particulate cogel material in a liquid medium comprising at least 75%, by weight of the liquid medium, of the organic liquid; and
   (5) subjecting the slurry to spray drying.
2. A method according to claim 1, wherein the liquid medium comprises at least 80%, by weight of the liquid medium of the organic liquid.

3. A method according to claim 1, wherein the particles are present in an amount of from 1–15% by weight of the slurry.

4. A method according to claim 1, wherein the organic liquid is miscible with water.

5. A method according to claim 4, wherein the organic liquid contains oxygen.

6. A method according to claim 5, wherein the organic liquid is an alcohol.

7. A method according to claim 6, wherein the alcohol is selected from methanol, ethanol, n-propyl alcohol, i-propyl alcohol, n-, sec- and tert-butyl alcohols, pentan-1-ol, pentan-2-ol, 3-methylbut-1-ol and hexan-1-ol.

8. A method according to claim 5, wherein the organic liquid is selected from acetone, methyl propyl ketone, methyl isobutyl ketone, butyl aldehyde, ethyl acetate and isopropyl acetate.

9. A method according to claim 1, which additionally includes providing in the particles a catalytically active chromium compound or a compound convertible thereto.

10. A method according to claim 1, wherein the cogel contains, as the said at least one other metal oxide, at least one of $TiO_2$, $Al_2O_3$, $ZrO_2$ and $MgO$.

11. A method according to claim 1, which includes the additional step of milling the composition produced from step (4) to obtain a milled said slurry of particulate material.

12. A method according to claim 9, wherein the particles are milled to a weight mean particle size of from 5 to 25 microns.

13. A method according to claim 10, wherein the hydrogel is obtained by the reaction of a mineral acid and an alkali metal silicate in the presence of cations of the metal of the said at least one other metal oxide.

14. A method according to claim 13, wherein the said reaction is carried out by directing, under pressure, each of a solution of the alkali metal silicate and a solution of the mineral acid to a high shear mixing region.

15. A method according to claim 13, wherein each of the silica concentration, pH and temperature of the reaction medium is adjusted to provide a gelation time of from 0.5 to 10 minutes inclusive.

16. A method according to claim 15, wherein the said adjustment provides a gelation time of from 3 to 5 minutes.

17. A method according to claim 13, wherein the silica concentration in the hydrogel is from 5 to 15% w/w inclusive.

18. A method according to claim 13, wherein the pH of the reaction mixture is from 3–9.

19. A method according to claim 1, wherein the ageing is carried out for at least 1 hour.

20. A method according to claim 1, wherein the ageing is carried out a pH from 6–10 inclusive.

21. A method according to claim 20, wherein the pH is from 7–9 inclusive.

22. A method according to claim 1, wherein the ageing is carried out at a temperature of from 50°–100° C. inclusive.

23. A method according to claim 1, wherein the washing step is carried out before ageing.

24. A method of preparing substantially spherical particles comprising silica and titanium and having a pore volume of at least 2.3 cc/g, a surface area of at least 300 $m^2/g$ and a weight mean particle size of from 20 to 150 microns, which process comprises the steps of forming a slurry of porous particulate material comprising silica and titanium and having a weight mean particle size of from 5 to 25 microns in a liquid medium comprising at least 96%, by weight of the liquid medium, of an organic liquid and subjecting the slurry to spray drying, thereby to cause agglomeration of the said particulate material to provide the said spherical particles.

25. A method according to claim 1, which includes the additional step of activating the resultant materials heat treatment in the presence of air at a temperature of at least 450° C.

* * * * *